No. 781,584. PATENTED JAN. 31, 1905.
J. J. AULL.
LUBRICATOR.
APPLICATION FILED OCT. 10, 1904.
5 SHEETS—SHEET 1.
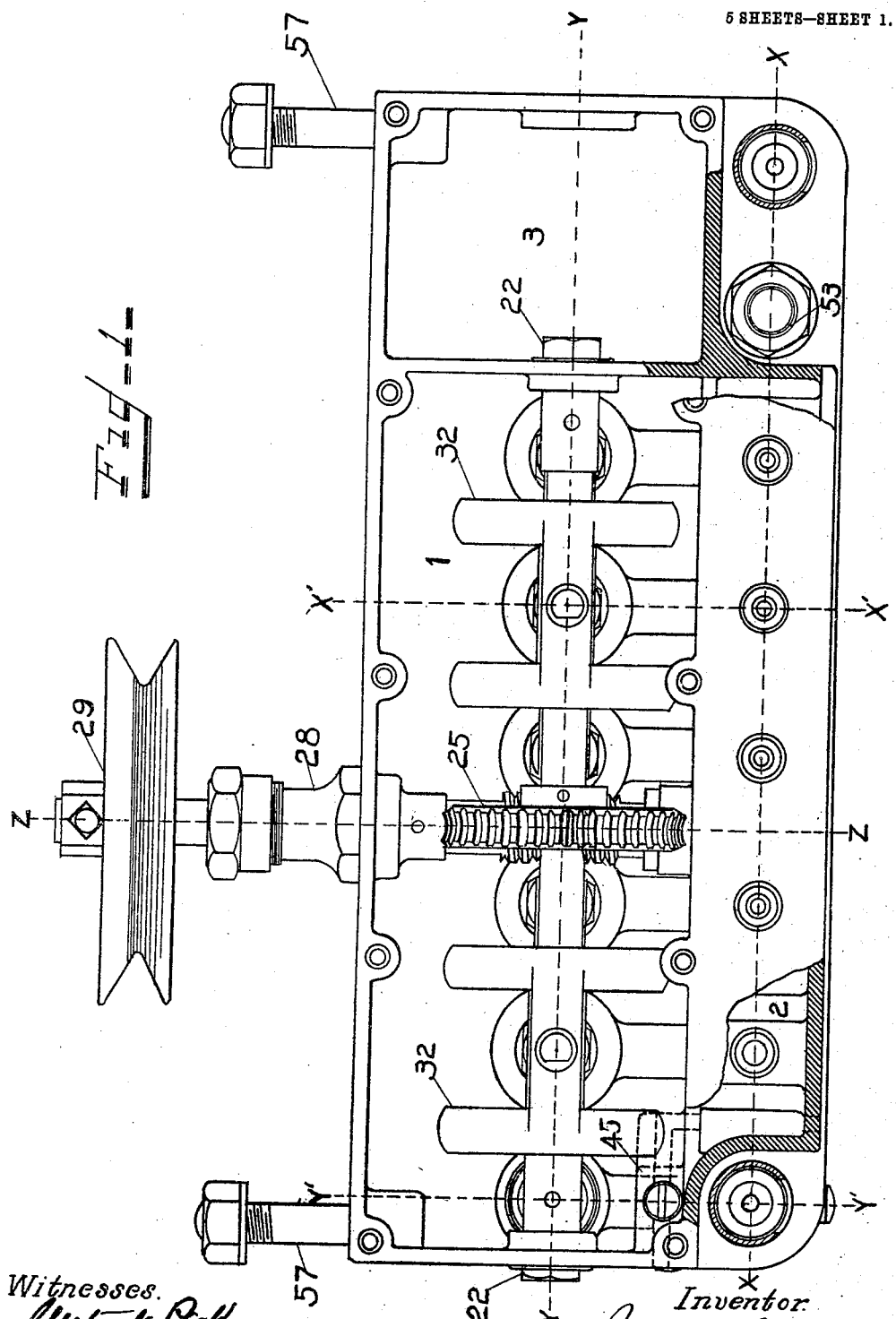
Witnesses.
Inventor.

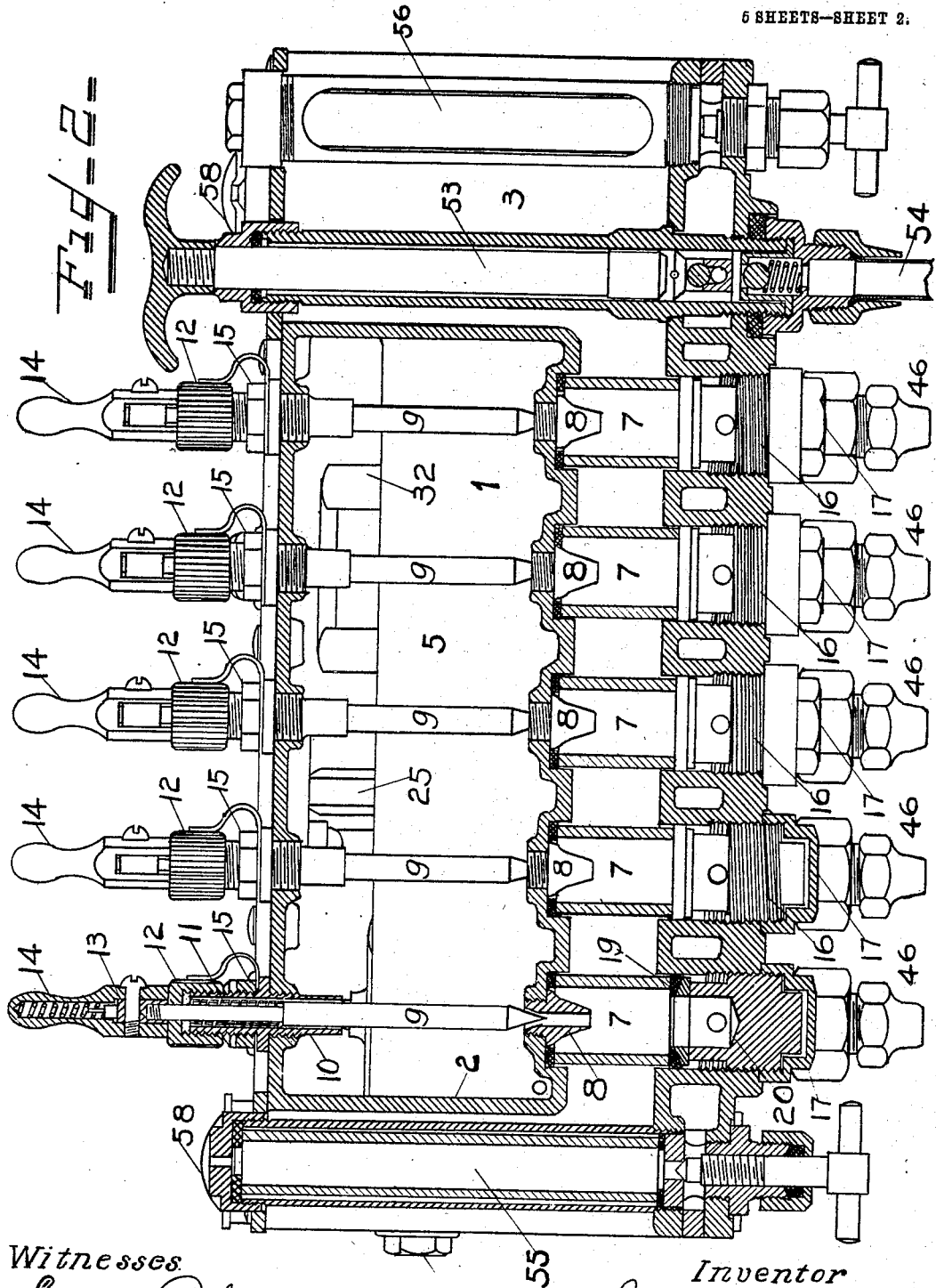

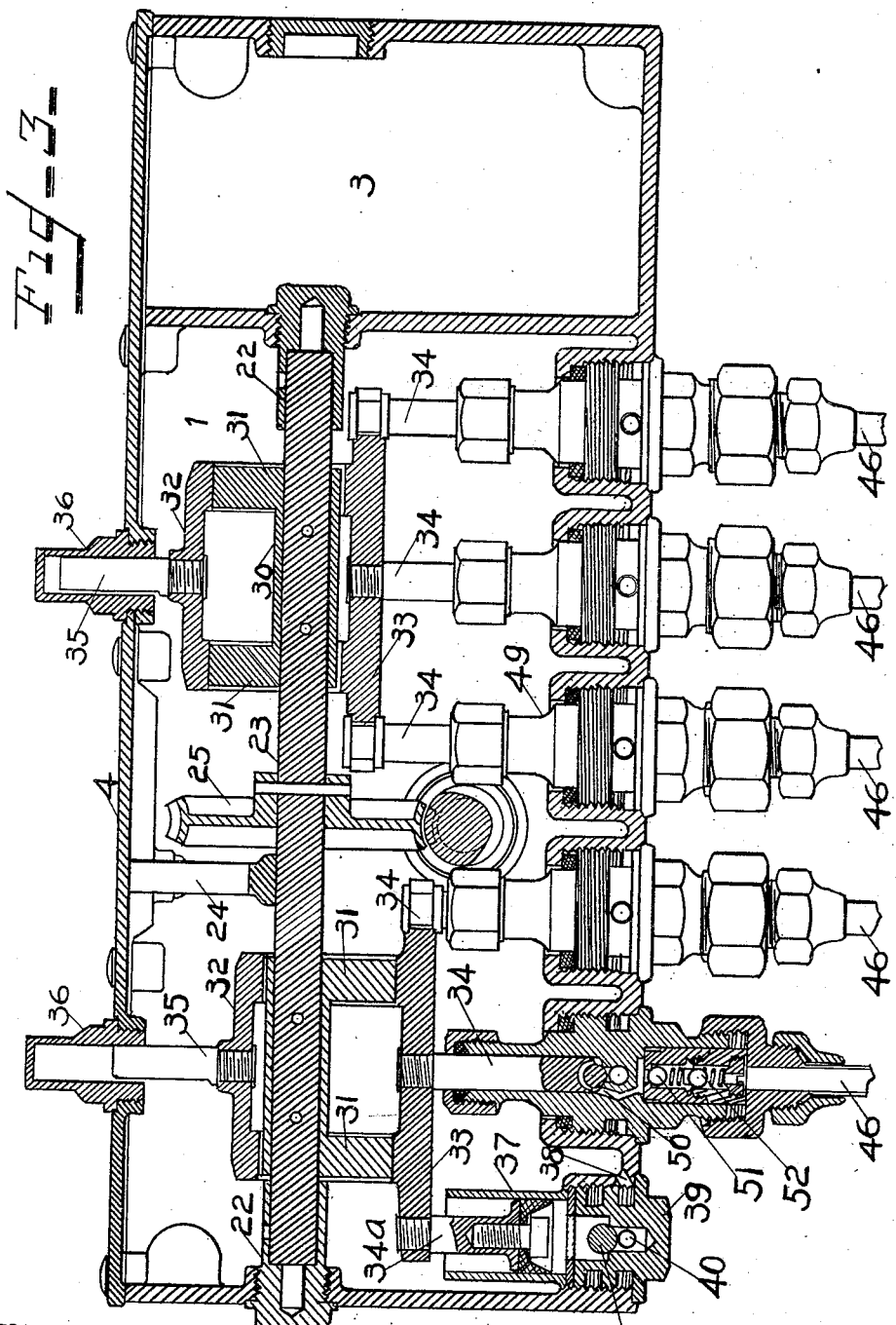

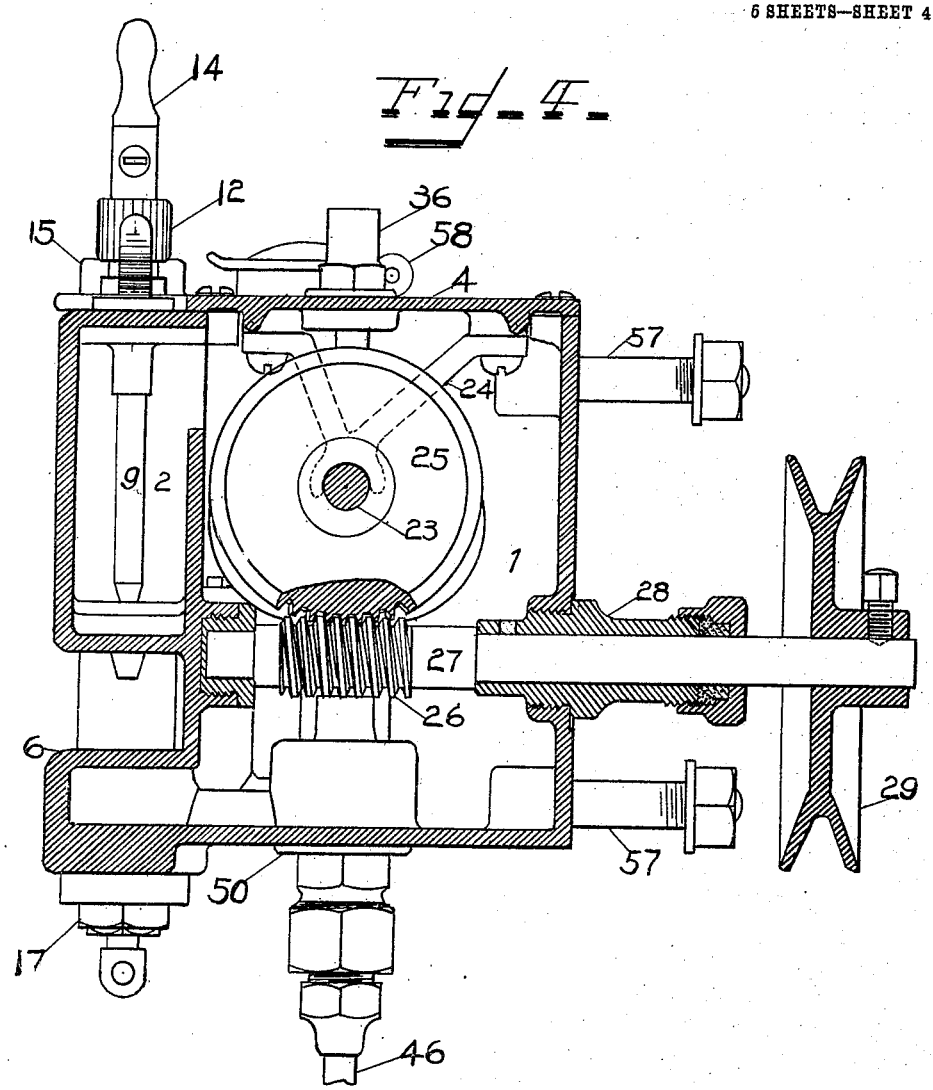

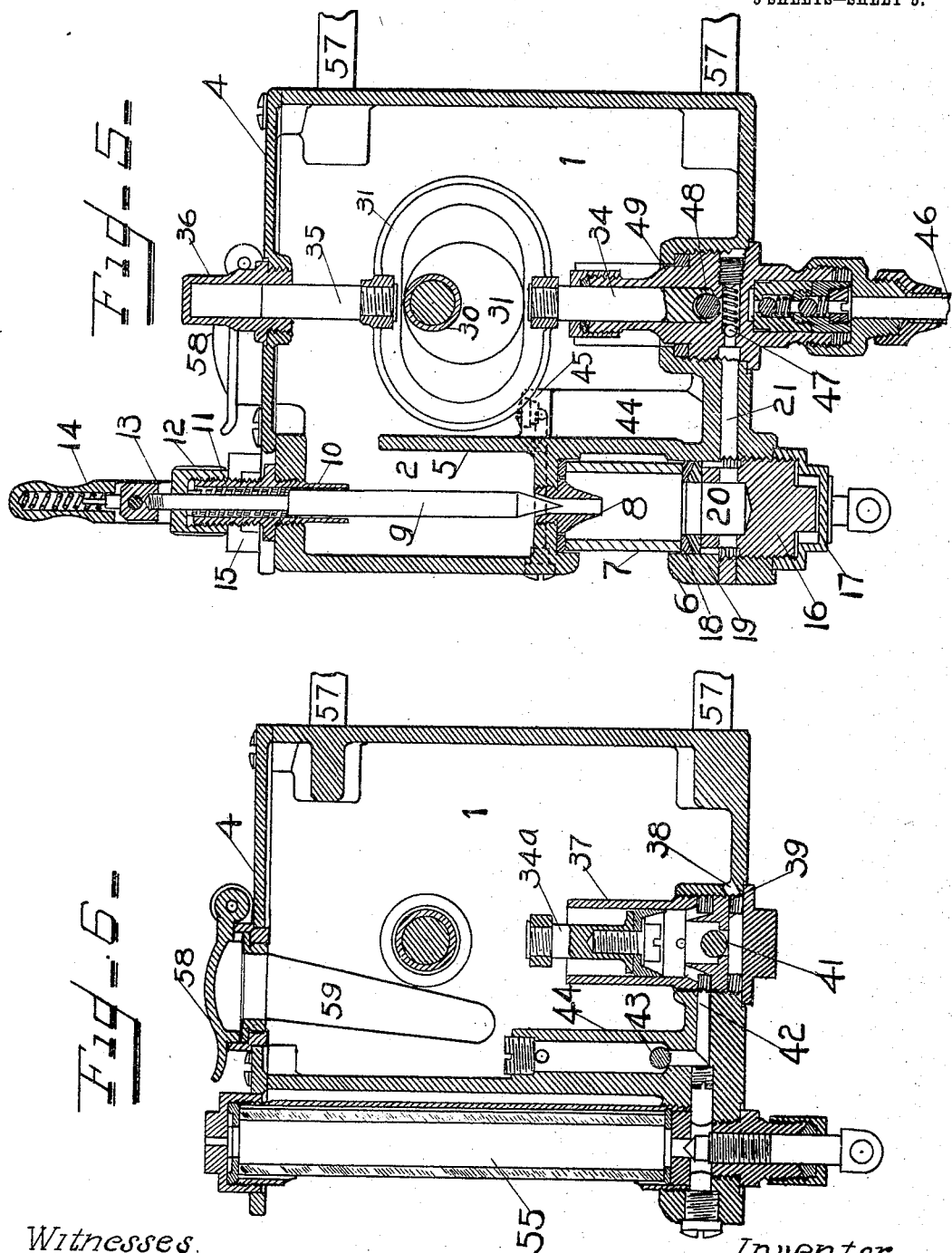

No. 781,584.                                                     Patented January 31, 1905.

UNITED STATES PATENT OFFICE.

JEROME J. AULL, OF CINCINNATI, OHIO, ASSIGNOR TO THE LUNKEN-
    HEIMER COMPANY, OF CINCINNATI, OHIO, A CORPORATION OF
    OHIO.

LUBRICATOR.

SPECIFICATION forming part of Letters Patent No. 781,584, dated January 31, 1905.

Application filed October 10, 1904. Serial No. 227,843.

*To all whom it may concern:*

Be it known that I, JEROME J. AULL, a citizen of the United States, residing at Cincinnati, in the county of Hamilton and State of Ohio, have invented certain new and useful Improvements in Lubricators, of which the following is a full, clear, and exact description, reference being had to the accompanying drawings and the numerals of reference marked thereon.

My invention relates to mechanical or automatic lubricators, each of which is multiple in its construction, and is designed especially for automobile use and can be relied upon to positively and automatically force a supply of oil to the various bearings and cylinders where the absence of oil would result seriously.

The lubricator is very neat and compact in design, occupying but little space, and does not interfere with any of the other working parts of the automobile. The body and lid are preferably made of aluminium, thereby reducing the weight of the lubricator to a minimum. The trimmings are made of either hardened tool-steel or hard bronze composition, the moving steel parts in all instances having bronze bearings, which greatly reduce the friction and wear.

One of the many desirable features about the lubricator is that all parts subjected to wear can be readily renewed should necessity require it; but as all these parts constantly work in oil the machine will stand long and severe uses without wear. There is also a sight-feed for every oil-outlet. This feature is highly essential, as it enables the operator at a glance to ascertain whether the various cylinders or bearings are being properly oiled. It sometimes happens that foreign matter in the oil becomes lodged in the passages, preventing the necessary flow. Every drop of oil that falls into the sight-feed glass is bound to be forced to the parts to be lubricated, as it is absolutely positive in action.

The novelty of my invention will be hereinafter more specifically described, and pointed out in the claims.

In the accompanying drawings, Figure 1, Sheet 1, is a plan view, partly in section, of the lubricator embodying my invention with the lid removed. Fig. 2, Sheet 2, is a section of the lubricator on the dotted line *x x* in Fig. 1. Fig. 3 is a section on the dotted line *y y*. Fig. 4, Sheet 4, is a broken transverse section on the dotted line *z z* looking toward the left. Fig. 5, Sheet 5, is a transverse section through the dotted line *x' x'*. Fig. 6, Sheet 5, is a transverse section through the dotted line *y' y'* of Fig. 1.

The same numerals of reference are used to indicate identical parts in all the figures.

By preference the body of the lubricator is oblong and substantially rectangular in shape with three oil-compartments 1, 2, and 3, as indicated in Figs. 1, 4, and 5. The lid or cover 4 removably covers in one piece all of these compartments except 2, and the body or case thus formed is preferably constructed of aluminium. The compartments 1 and 2 have double communication with each other, (see Fig. 5,) one afforded by the inner wall 5, Fig. 5, which does not extend to the top of the lid, and the other through the lower part of the compartment 2, which is fed by a pump, as will be hereinafter explained. The compartment 2, it will be observed, stands out from the front of the main body of the lubricator as a box, beneath which the lower front end of the lubricator also stands out, affording a shelf-like structure 6, as seen in Figs. 4 and 5. The compartments 1 and 2 carry a fine grade of oil for the engine-cylinders, while the compartment 3 carries a heavier grade of oil for the different bearings of the machine. Between suitable bearings in the under side of the box or compartment 2 and in the top of the shelf 6 are inserted with proper unions and packings sight-feed glasses 7 (see Figs. 2 and 5) and of which there are in this instance five, though more or less may be employed, and opening into each sight-feed glass at its top is a feeding-nipple 8 in the form of a plug screwed into the bottom of the compartment 2 and having a central perforation through it, whose upper end is tapered to form a valve-seat to receive the lower tapered end of a valve-stem 9, whose upper end is guided in a plug-sleeve 10, screwed through the top of the compartment 2. The reduced upper end of each valve-stem is surrounded by a coiled spring 11, whose upper end has a bearing against the under side of a milled or ratchet nut 12, screwed upon the upper threaded end of the plug-sleeve 10 and bearing upon a nut 15, likewise screwed upon said plug-sleeve and resting upon the cap 4. The upper end of the valve-stem has upon it a head-piece 13, pivoted in a well-known manner to a well-known snap-handle 14, and by means of which construction the valve is opened to permit the oil to fall by drops through the sight-feed glass 7 under the constant inspection of the operator and by which the oil can be entirely cut off at times or the size of the drop regulated by manipulating the nut 15. This feeding structure is common to the art and needs no further description.

Beneath each sight-feed glass is a bore through the shelf 6 to permit the passage of the sight-feed glass in first introducing it or in removing it when broken and replacing the broken glass by a new one, and in this bore is screwed a plug 16 from the bottom, over which is screwed a cap 17. The upper end of the plug 16, together with the washers 18 and 19 above it, form a chamber or receptacle 20 in the shelf 6 directly beneath each sight-feed glass, and a duct 21 extends from each of these chambers to pump mechanism, to be presently explained.

In removable shaft-guide plugs 22, secured in each end of the main compartment 1, (see Fig. 3,) is journaled a steel shaft 23, braced at or near its middle by a downwardly-projecting yoke 24, secured to the lid 4 and straddling the shaft 23 to form a partial bearing to prevent upper thrust. (See Figs. 3 and 4.) Pinned or otherwise fast upon the shaft 23, adjacent to the yoke 24, is a worm-wheel 25, which meshes with a subjacent worm 26 on a shaft 27, journaled at one end in the compartment 1 and extending out through a screw-plug stuffing-box 28 in the rear wall of the compartment 1, as seen in Fig. 2. Fast upon the outer end of the shaft 27 is a grooved pulley or sprocket-wheel 29, geared in any suitable manner, as by belt or sprocket-chain, to a similar wheel (not shown) on the cam or other shaft of the motor, so that whenever the automobile is running the shafts 27 and 23 are likewise being rotated. On each side of the worm-wheel is pinned or otherwise made fast to the shaft 23 a sleeve 30, carrying at each end a cam 31, (see Figs. 3 and 5,) and these cams are confined in yokes 32, whose lower members constitute cross-heads 33. Attached to each of these cross-heads are three plungers 34, Fig. 3, five of which are identical in construction and mode of operation and which deliver the oil to the parts to be lubricated, while the remaining one, 34ª, constitutes part of a pump mechanism for delivering oil from the compartment 1 to the compartment 2 when the oil in compartment 1 gets below the level of the wall 5, though, in fact, this pump is continuously pumping oil into the compartment 2 at all times for the purpose of constantly maintaining a head of oil above the sight-feed glasses regardless of the level of oil in chamber 1.

Extending up from each of the yokes 32 is a guide-stem 35, which is confined in the bore of a screw-plug 36, screwed into the lid 4, and serves as a guide for the constant vertical reciprocation of the yokes under the action of the cams 31 at all times. A groove or flattened portion is formed on one side of each of the guide-stems to permit the passage of air around the stem to prevent their sticking or creating a vacuum, which would interfere with the working of the yoke. Upon the bottom of each yoke is a cross-head 33, one carrying three plungers 34 for the one yoke and the other two plungers 34 and a third plunger 34ª for the other yoke. The plunger 34ª fits the barrel 37 and forms an auxiliary pump which draws the oil through an aperture 38, Fig. 3, into a circumferential groove in a plug 39, screwed into the bottom of the compartment 1, and which delivers the same through an aperture 40 into a chamber covered by a ball-valve 41 directly beneath the sucker of the plunger 34ª, so that on every upstroke of the plunger 34ª the pump-barrel 37 is filled with oil which passes through the passage 42, thence up past the ball check-valve 43 in the upright leg 44, and thence sidewise through the horizontal leg 45, Figs. 1 and 5, and through an aperture in the bottom of the compartment 2, and in this way a supply of oil is kept in the compartment 2 above the nipple-feeds irrespective of the height of the oil in the compartment 1.

To feed the oil which drops continuously from the vents of the nipples through the sight-feed glasses into the different pipes, I employ the pumping mechanism illustrated more particularly in Figs. 3 and 5, where, as before stated, the plungers 34 draw the oil from the receptacles 20 through the ducts 21 past a spring-closed check-valve 47 and past a ball check-valve 48 into the barrels 49 of these pumps, so that on the downstroke of the plungers 34 the oil is forced through the passages 50 and past the two upwardly-spring-pressed ball check-valves 51 and 52, located in a vent-passage extending from the pump-barrels into the discharge-pipes 46, which are suitably connected to the pump-barrel plugs and lead to the different bearings to be lubricated.

In this simple manner and by this compact construction of parts I am enabled to regulate the feed to all of the bearings, or I can by means of the snap-handles 14 cut it off altogether or let it on to only such of the bearings as require lubrication and to those in the proper degree required.

As a continuation of the compartment 1 at one side is the isolated compartment 3 for holding a heavier grade of oil and which is provided with a hand-pump 53, with inlet and eduction ports and check-valves for drawing the oil from the compartment 3 into the pump-barrel and then discharging it through the pipe 54 to the crank-case or other bearings which do not require such a fine grade of oil as the other parts of the machine.

At each end of the body of the lubricator is a gage-glass 55 for the compartment 1 and 56 for the compartment 3. There is no particular novelty about these gage-glasses, and they may be constructed and applied in the usual or any suitable manner, their only purpose being to afford a means of ascertaining the height of oil in the compartments 1 and 3. The lubricator as thus constructed may be attached by bracket-bolts 57 upon the rear side of the body to the dashboard of the automobile, with the sight-feed glasses facing the operator of the machine and with the driving-pulley 29 on the opposite side of the dashboard and connected with any suitable part of the driving-gear.

For convenience in supplying oil to the compartments 1 and 3 there is a filling-hole at each end of the lid 4, (see Figs. 2, 5, and 6,) which is covered by a hinged lid 58 and into which is inserted a fine-meshed strainer 59. This strainer catches all of the impurities as the oil is poured into the compartments 1 and 3 and can be readily removed for cleansing.

Having thus fully described my invention, I claim—

1. In a multiple self-feeding lubricator, the combination of an oil-reservoir divided into a main compartment and an auxiliary compartment communicating therewith, a series of valve-controlled sight-feeds opening from the bottom of said auxiliary compartment, from which extend chambers, pumping mechanisms automatically actuated and communicating with said chambers, check-valves in discharge-outlets from each of the pumps and sight-feed mechanisms and leading to the parts to be lubricated, substantially as described.

2. In a multiple self-feeding lubricator, the combination of an oil-reservoir divided into a main compartment and an auxiliary compartment communicating therewith, a series of valve-controlled sight-feeds opening from the bottom of said auxiliary compartment from which extend chambers, pumping mechanisms automatically actuated and communicating with said chambers, check-valves in discharge-outlets from each of the pumps and sight-feed mechanisms and leading to the parts to be lubricated, and an auxiliary pump connected with the other pumps for pumping oil from the main compartment into the auxiliary compartment, substantially as described.

3. In a multiple self-feeding lubricator, the combination of an oil-reservoir divided into a main compartment and an auxiliary compartment communicating therewith, a series of valve-controlled sight-feeds opening from the bottom of said auxiliary compartment from which extend chambers, pumping mechanisms automatically actuated and communicating with chambers leading from said auxiliary compartments, the pumping mechanisms in said main oil-compartment adapted to be actuated by the running of the engine to be lubricated check-valves in discharge-outlets from each of the pumps and sight-feed mechanisms and leading to the parts to be lubricated, substantially as described.

4. In a multiple self-feeding lubricator, the combination of an oil-reservoir divided into a main compartment and an auxiliary compartment communicating therewith, a series of valve-controlled sight-feeds opening from the bottom of said auxiliary compartment, pumping mechanisms automatically actuated and communicating with said chambers, the pumping mechanisms in said main oil-compartment adapted to be actuated by the running of the engine to be lubricated, check-valves in discharge-outlets from each of the pumps and sight-feed mechanisms and leading to the parts to be lubricated, and an auxiliary pump connected with the other pumps for pumping oil from the main compartment into the auxiliary compartment, substantially as described.

5. In a multiple self-feeding lubricator, the combination of an oil-reservoir divided into a main compartment and an auxiliary compartment, a series of sight-feeds leading independently from said latter compartment to the parts to be lubricated, valve mechanisms to regulate said sight-feeds, and an automatically-actuated pumping mechanism in the main reservoir connected with the auxiliary compartment to keep a constant supply of oil therein, substantially as described.

6. In a multiple self-feeding lubricator, the combination of an oil-reservoir divided into a main compartment and an auxiliary compartment, a series of sight-feeds leading independently from said latter compartment to the parts to be lubricated, valve mechanisms to regulate said sight-feeds, an automatically-actuated pumping mechanism in the main reservoir connected with the auxiliary compartment to keep a constant supply of oil therein, and additional automatic-pumping mechanisms in the main compartment to draw the oil from the sight-feeds and discharge it through ducts to the parts to be lubricated, substantially as described.

7. In a multiple self-feeding lubricator, the combination of a main oil-reservoir 1, a sight-feed reservoir 2 communicating therewith and provided with sight-feed mechanisms, a series of pump-barrels in the main oil-reservoir connected to said sight-feed mechanisms, pistons in said pump-barrels, a worm-actuated shaft journaled in said main reservoir, cams fast upon said worm-shaft and engaging yokes fast to said pump-pistons and suitably guided by stems 35, a worm-wheel engaging said worm-shaft and fast upon a shaft projecting from the main reservoir-casing, and an actuating-wheel for said worm-wheel adapted to be driven by the automobile or other engine to which said lubricator is connected, substantially as described.

JEROME J. AULL.

Witnesses:
WM. E. TEKLENBURG,
L. A. DOURSON.